Sept. 11, 1962  R. E. SCHULZE ET AL  3,053,268
TIME CONTROL AND METERING SYSTEM
Filed April 23, 1959  8 Sheets-Sheet 1

Fig. 1.

Inventors,
Robert E. Schulze,
Robert J. Jauch,
Christian W. Kruckeberg,

By. Wilson & Geppert
Attorneys.

Sept. 11, 1962 R. E. SCHULZE ET AL 3,053,268
TIME CONTROL AND METERING SYSTEM
Filed April 23, 1959 8 Sheets-Sheet 3

Inventors.
Robert F. Schulze.
Robert J. Jouch.
Christian W. Kruckeberg.
By. Wilson & Seppert
Attorneys.

3,053,268
TIME CONTROL AND METERING SYSTEM
Robert E. Schulze, Deerfield, Ill., and Robert J. Jauch and Christian W. Kruckeberg, Fort Wayne, Ind., assignors to Culligan, Inc., Northbrook, Ill., a corporation of Delaware
Filed Apr. 23, 1959, Ser. No. 808,437
3 Claims. (Cl. 137—192)

The present invention relates to a novel time control and metering system and more particularly to a novel means for and manner of automatically controlling the regeneration of a water conditioning unit such as a water softener or filter and for readily and accurately establishing a proper salt dosage for the regeneration cycle.

In prior regeneration systems the controls for an automatic water softener are so divided and spaced apart as to require that adjustments in regeneration frequency or changes in salt dosage be made in plural locations, the salt dosage being usually changed by the resetting of a float control or probe down in the brine tank while the other regeneration controls are adjusted at the softener.

Furthermore, in such prior brining systems it has been determined that the float controls are not reliable, the buoyancy of the float being usually insufficient for positive valve action and the accuracy of the level control is unsatisfactory, being normally in the range of one-half to two pounds and this depending upon the type of salt employed in the brine tank. Consequently, many manufacturers of water softeners are required to specify that a specific type of salt be used.

In such prior systems the brine withdrawn from the brine tank is dependent not only on the float level but also upon the void volume between the solid salt particles, for as the salt particles dissolve the void volume changes and any caking of the semi-wet salt causes considerable variation in void volume which in turn results in a substantial variation in salt dosage.

Another objection to such prior systems employing a valve in the brine tank is that such systems require a water line under pressure running from the brine tank to the water softener, and those employing a probe system require current carrying wires running from the water softener to the wet and corrosive brine tank. Such requirement in either system results in further objectionable problems.

A further disadvantage in the prior systems is that the regeneration frequency controls are generally quite complicated and it is practically impossible for a customer or user to operate and set, so that they generally require the calling of a service man to make the necessary adjustments.

A still further objection is that the pilot system for most prior water softeners employs a single acting valve for economic reasons, and it is inherent in such pilot systems of the single acting type that water is wasted during the entire regeneration cycle since the valve remains open and water flows out a vent orifice during this entire period.

All of the above objections and disadvantages of the prior systems are eliminated in the present novel time control and metering system in which all controls are conveniently disposed in a single location and arranged in a compact control unit, such unit having provision for the setting or charging of salt dosage simply by turning a conveniently located and readily accessible control knob.

In the present invention salt dosage is controlled independently of void volume with the refill volume being accurately and positively controlled and in a novel manner. It provides for accuracies at a given water pressure as exacting as .04 pound of salt regardless of the type of salt used, and this novel salt dosage control also embodies means for regulation of the salt dosage with changes in water pressure encountered in use.

Another important feature of the present invention is that it overcomes the problem of valve corrosion as there is no valving in the brine tank and the danger of overflowing brine tanks due to valve corrosion is effectively avoided.

In the present invention all controls are located in one localized position or area at the softener and there is but a single communicating line to the brine tank which is never under line pressure so that all problems previously presented with pressure line failures have been successfully eliminated. This feature permits use of a thinner and more economical tubing without danger of failure.

Unlike the complicated controls of prior systems, in the present system the location and arrangement is such that the customer or user does not have the expense of a service call to obtain the desired adjustments as the regeneration frequency control may be conveniently and readily actuated by operating several push buttons and the salt dosage may be changed by merely turning a control knob.

Another important feature of the present invention is the elimination of the need for a float control valve in the system, and the provision of a diaphragm-actuated valve which is positively closed by water pressure and opened by vacuum, thereby requiring no pilot valve for its operation.

The present control system is so designed and constructed as to eliminate the need for solenoid valves and the electrical power required to operate such solenoid valves. In its preferred embodiment, mechanical valves are employed and the system operated with either a mechanical timer or a small battery-operated timer as the current draw is extremely small. The entire control system and all pilot valves are operated by a single timer motor and a novel double cam system whereby to reduce the power requirement and to provide an accurate snap action valve system.

By the present contemplated use of mechanical valves, valves of plastic construction are preferably employed and thereby eliminate all valve corrosion. This is a distinct advantage over the prior use of solenoids which necessarily require the use of metals having magnetic properties. Another important advantage of the present mechanical valve assemblies is that they are packless.

A further important feature in the present novel control system is that in the setting and adjustment of the controls, these controls may be synchronized to the time of day without causing regeneration, thus eliminating one of the problems with prior control systems when they are set initially or when they are reset due to stoppage of electrical power. When said setting or resetting causes the control to go past the normal selected hour for regeneration, in such prior systems regeneration was initiated.

With the present novel control system extra regeneration may be established and carried out but without upsetting the normal predetermined automatic regeneration schedule.

Further objects are to provide a construction of maximum efficiency, economy and ease of assembly and operation, and such further objects, advantages and capabilities as will later more fully appear and are inherently possessed thereby.

In the drawings there is disclosed a novel time control and metering system including a novel control unit for automatically controlling the frequency and steps of regeneration of a water conditioning system such as a water softener or filter and for accurately, easily and readily establishing and controlling a proper salt dosage for use in such regeneration.

Figure 1:
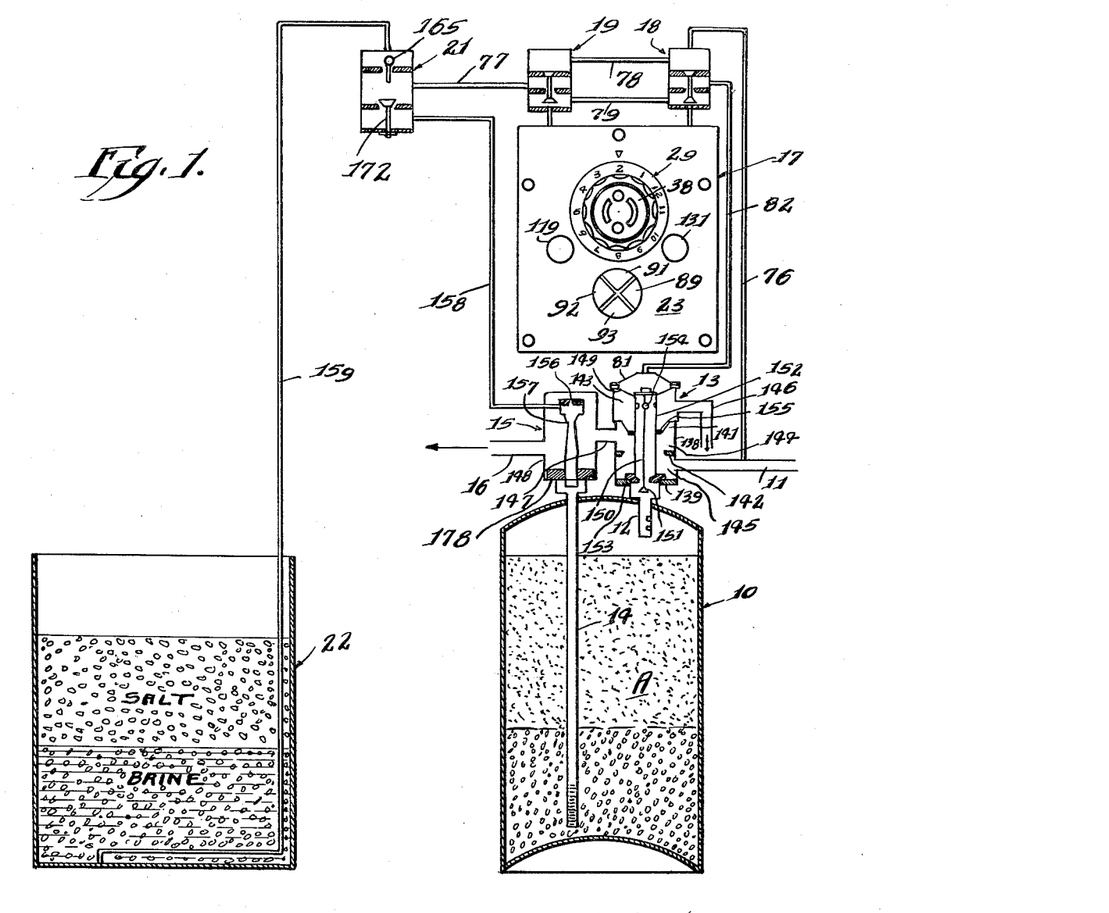
FIGURE 1 is a diagrammatic view of a water conditioning system in which is embodied the present invention.

In the illustrative embodiment of a water conditioning system in which the present invention automatically controls the regeneration cycle at a predetermined time period and frequency, FIG. 1 discloses a water softener comprising a tank 10 containing an ion exchanger or filter bed A, with the untreated water from a water supply source entering the tank during service operation through an inlet 11 of a main control valve assembly 13, passing downwardly and outwardly through the wide slots of inlet manifold 12, into and through the minerals of the bed A, entering the narrow slots of an outlet manifold 14 and passing upwardly through this outlet manifold depending into the tank 10 and outwardly through an outlet port in an eductor assembly 15 to the service line at 16. This is the path of the entering untreated water and of the discharged treated water during normal service operation.

As the bed of minerals or treating material A in the tank 10 tends to become inactivated by ion exchange resulting in a reduction in the quality of the effluent, regeneration is required when the quality of the effluent reaches a point where it is no longer suitable for the purpose intended.

To automatically effect regeneration at a predetermined time; for example, once or twice each day, or once each two or four days, the present invention comprehends, in addition to the main control valve assembly 13 and eductor assembly 15, a novel control system comprising a time control mechanism 17, a pair of timer control or pilot valve assemblies 18 and 19, a brine control valve 21, a brine tank 22 and conduits connecting these components as hereinafter described.

The novel time control mechanism 17 shown in FIGS. 1 to 15, inclusive, comprises a control panel having a face plate 23, a rear plate 24 and intermediate plates 25 and 26 with these plates mounted in spaced relation upon transverse connecting screws 27 by spacing sleeves 28. At the exterior and substantially centrally of the face plate 23 is provided an hour dial 29 on the outer end of a rotatable shaft 31 (FIGS. 1, 2, 3 and 10) projecting through and journalled in openings in said spaced plates 23, 24, 25 and 26.

Figure 6:
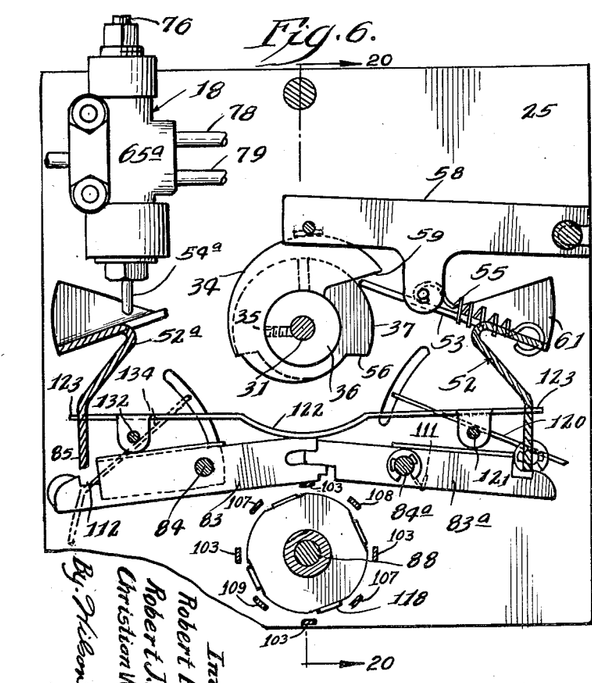
FIG. 6 is a fragmentary view in vertical cross section taken in the same plane as FIG. 5 but viewed in the direction of the arrows designated as 6—6.
Figures 10, 16, 17:
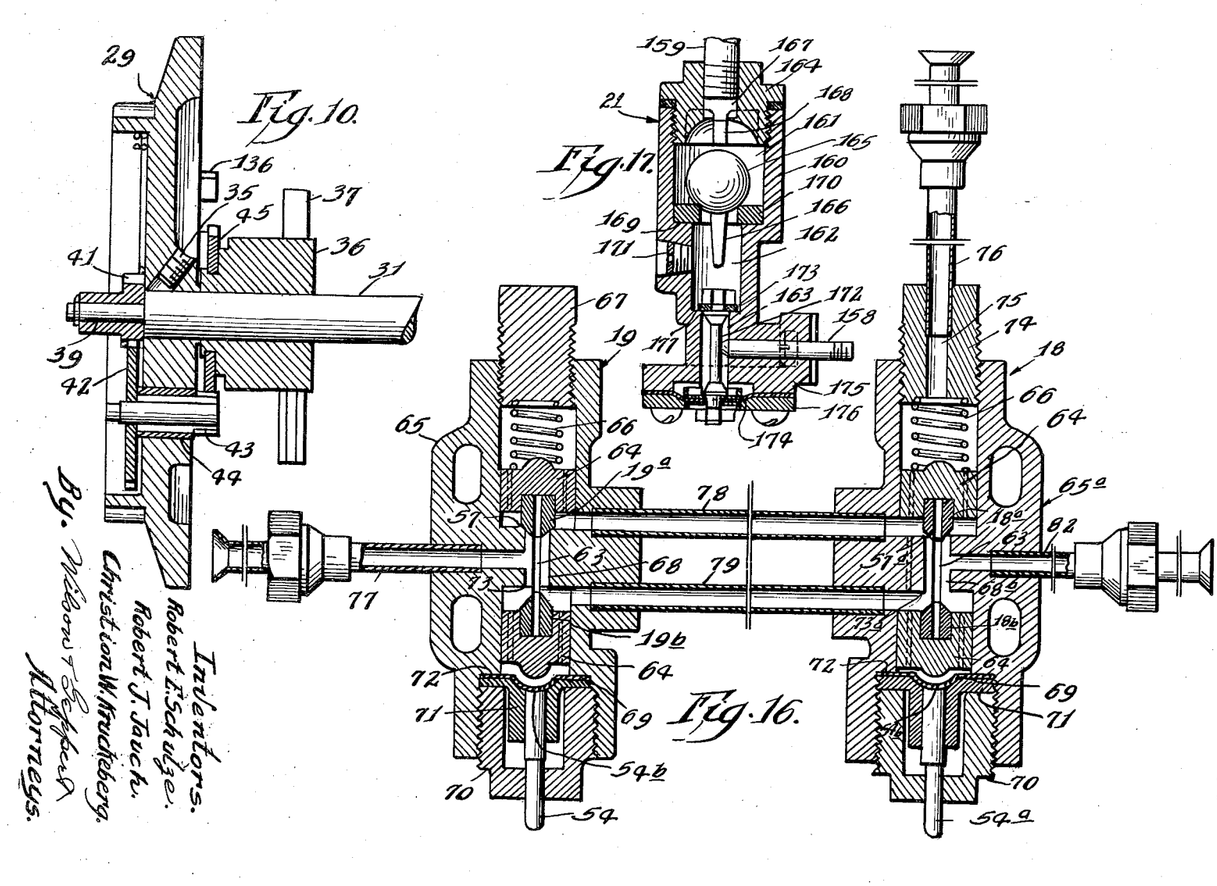
FIG. 10 is an enlarged view in vertical cross section through the dial assembly but with the salt dial removed, the view being taken on approximately the line 10—10 of FIG. 2 and viewed in the direction of the arrows.
FIG. 16 is a view in vertical cross section taken longitudinally through the pilot valves shown diagrammatically in FIG. 1.
FIG. 17 is a view in vertical cross section through the brine valve shown diagrammatically in FIG. 1.

Upon the shaft 31 are mounted the hubs of spaced cams 32, 33 and 34 by any suitable securing means, such as set screws 35, and about the shaft 31 is an encompassing collar or sleeve 36 to which is secured a cam 37 free to be adjusted relative to the cam 34 on the shaft 31. The angular relation of the cams 34 and 37 determines the length of the refill period which is established by moving a salt dial 38 connected to the collar 36 that mounts the cam 37 as shown in FIGS. 6 and 10. As shown in greater detail in FIG. 10, the hour dial 29 is affixed to the shaft 31 by a set screw 35 and the outer face of this dial is dished and upon the reduced outer end 39 of the shaft 31 is secured the hub of a pinion 41 in meshing engagement with a gear 42 on one end of a gear case and pinion 43 journalled in a sleeve bearing 44, the pinion meshing with a gear 45 affixed to and adapted to rotate the collar 36 and its cam 37. Thus moving the salt dial 38, shown in FIGS. 2 and 3 but removed in FIG. 10, adjusts the position of the cam 37.

Figure 2:
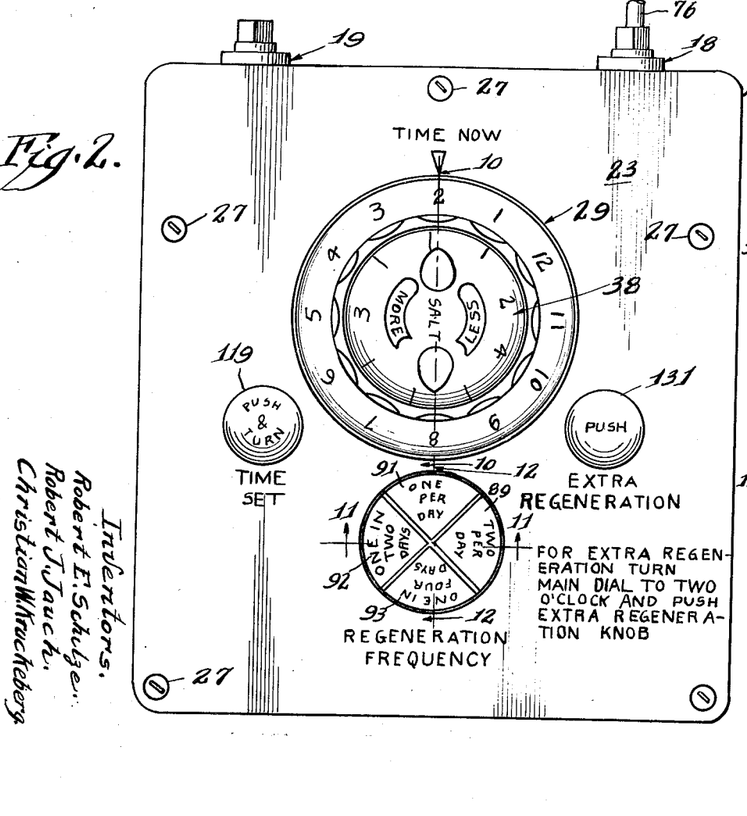
FIG. 2 is a view in front elevation of the timer unit or control panel.
Figure 3:
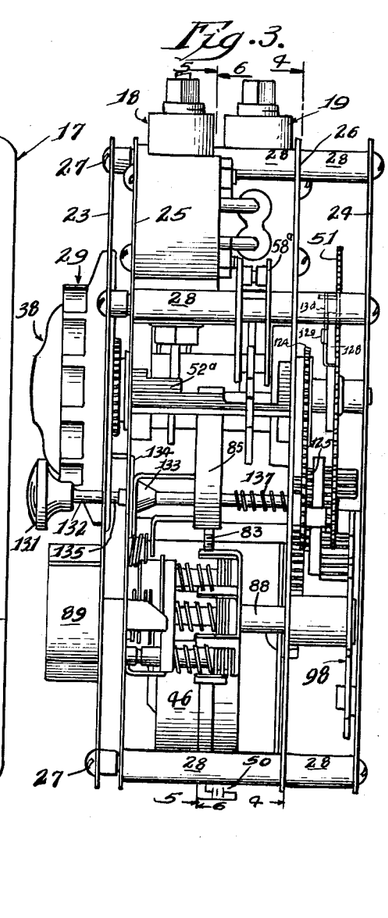
FIG. 3 is a view in end elevation of the timer or control panel assembly of FIG. 2.
Figure 5:
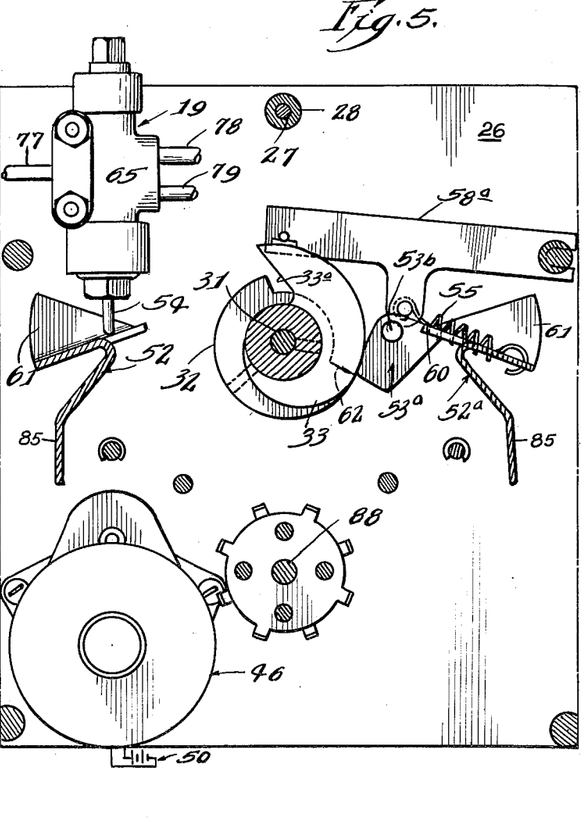
FIG. 5 is a view in vertical cross section taken substantially in a plane represented by the line 5—5 of FIG. 3 and viewed in the direction of the arrows.

A timer or clock motor 46 (FIG. 5) is connected by means of clutches 47 and 48 and gears 49 and 51 to the shaft 31 which in the disclosed embodiment makes one revolution in each twelve hours, the rate of rotation of the shaft being adapted to the most frequent regeneration cycle, such as the selected twelve hours. The hour dial 29 is also connected to the shaft 31 and is inscribed to indicate the twelve hours of the day (FIG. 2). This time or clock motor may be energized by the line voltage or from a battery, as shown at 50 (FIG. 5).

As shown in FIGS. 6, 7, 8 and 9, a toggle 52 is provided with a toggle arm 53 riding at one end upon the cam 37. This toggle is disposed below a depending valve stem 54 of the brine refill pilot valve assembly 19 (FIG. 5) mounted at the upper portion of the timer control unit 17. The toggle 52 is provided with a coil spring 55 and is held out of contact with this brine pilot valve stem 54 as long as the toggle arm 53 is riding on the high side of the cam 37, but when the toggle arm 53 reaches the cam drop-off 56, the shaft 31 and the cam 37 being rotated in a counter-clockwise direction as viewed in FIGS. 6, 7, 8 and 9, or clockwise as viewing the shaft 31 in FIG. 5, the toggle snaps the upper valve 19$^a$ (FIG. 16) of the pilot valve assembly 19 open from its seat 57 by pushing upwardly against the valve stem 54.

A cam follower 58 rides on the cam 34 adjacent the cam 37. The pilot valve 19$^a$ remains open and the toggle 52 remains in the up position as long as the cam follower rides the high side of its cam 34 but when the cam drop-off 59 is reached, this cam follower drops and causes the toggle spring 55 to drop below the pivot point of the toggle 52 whereupon the toggle 52 returns to its down position and the brine pilot valve 19$^a$ closes. This method of operation effects accuracy within a few seconds in the control of the refill time. The toggle 52 is shown as extending through and guided in a triangular slot or sector 61 in each of the plates 25 and 26. The apex 60 of the sector 61 forms a pivot point for the toggle 52.

Figures 7, 8, 9:
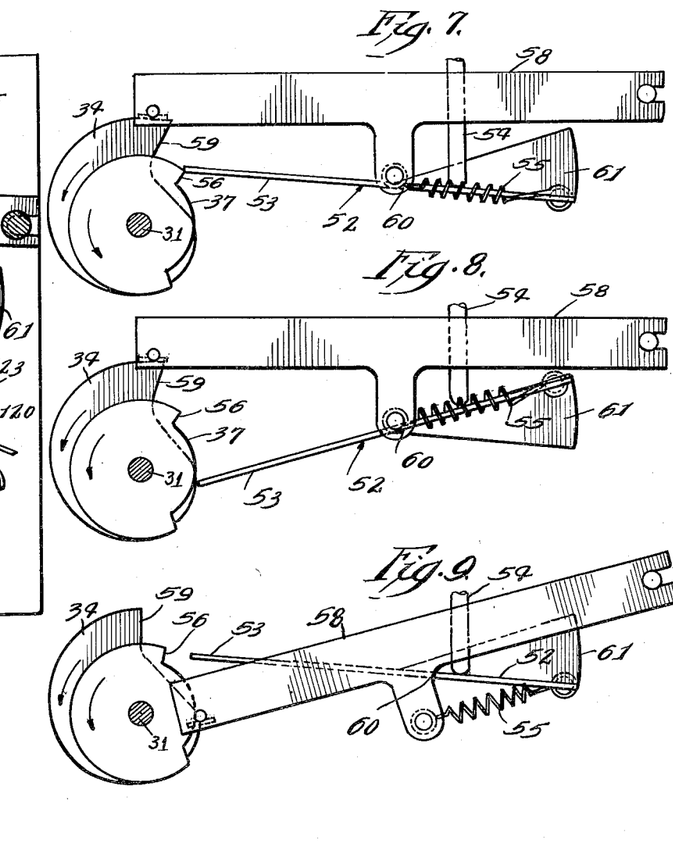
FIG. 7 is an elevational view showing diagrammatically the timer-cam latch mechanism with the toggle disposed in triggered position upon its cam and the valve stem lowered to close the valve.
FIG. 8 is a view similar to FIG. 7, but with the cam carrying the toggle rotated sufficiently to release the toggle which is shown in its released and down position and the valve stem elevated to open the valve.
FIG. 9 is another view of the timer-cam latch mechanism of FIGS. 7 and 8, but with the cam follower released and dropped as its cam is rotated to the position shown, causing the toggle to lower the valve stem and close the valve.

The described timer-cam latch assembly is shown in FIGS. 7, 8 and 9 in the three positions its toggle 52, cam follower 58 and the depending end of the valve stem 54 assume. In FIG. 7, the toggle 52 is in its triggered position on the cam 37 with the valve stem 54 down whereby the upper valve 19$^a$ of the valve assembly 19 is lowered to closed position.

In FIG. 8, the toggle 52 is shown in its down or released position in which it forces the valve stem 54 upward and opens the upper valve 19$^a$ of the valve assembly 19. In this position the cam 37 has rotated in its counter-clockwise direction sufficiently for the arm 53 of the toggle 52 to pass the cam drop-off 59, but the cam 34 has not advanced or rotated sufficient to permit its cam follower 58 to drop.

In FIG. 9, the cam 34 is shown advanced to the point where the cam follower 58 has dropped and caused the toggle 52 to release and permit the valve stem 54 to drop down whereby to close the upper valve 19$^a$.

A similar double cam system is shown in FIG. 5 for controlling the main pilot valve assembly 18 which controls the entire brine and rinse period preceding the brine refill period described above. This pilot valve assembly 18 also has a toggle 52$^a$ provided with a toggle arm or arm interlock 53$^a$ riding upon the cam 32, and a cam follower 58$^a$ riding upon the adjacent cam 33 having a cam drop-off at 33$^a$. When the toggle arm interlock 53$^a$ reaches the cam drop-off 62 on cam 32, the toggle 52$^a$ snaps the pilot valve 18$^a$ of the main pilot valve assembly 18 open by pushing against its valve stem 54$^a$. Pilot valve 18$^a$ remains in the up position as long as the cam follower 58$^a$ rides the high side of cam 33.

The pivot point 60 of each of the toggles 52 and 52$^a$ is at the apex of its slots 61, the toggle arm interlock 53$^a$ being pivotally mounted at 53$^b$. This arm interlock is held in contact with the cam face of the cam 32 and notched on its upper surface to receive an end of the toggle 52$^a$.

The brine refill pilot valve 19 shown in detail in FIG. 16 is provided in addition to the valve member 19$^a$ with a valve member 19$^b$ mounted in opposed relation upon a connecting stem 63 and movable as a unit, the spaced valve members being each connected to a valve stem guide 64 of polygonal shape so as to be freely slidable in the encompassing cylindrical interior of the valve body 65 and permit longitudinal flow therebetween. A coil or expansion spring 66 seating at one end against an adjustable valve plug 67 and at its other end against a guide 64 spring-biases these valve members 19$^a$ and 19$^b$ to their lowered position in which the upper valve member 19$^a$ seats against the valve seat 57 provided in the valve body to close off one end of the longitudinal port 68 in the valve body 65.

A valve diaphragm 69 is provided below the lower valve member 19$^b$ and its guide 64, the periphery of the diaphragm being retained by an adjustable cap 70 between a valve stem guide 71 and a shoulder 72 in the valve body 65 whereby the upper rounded end 54$^b$ of the valve stem 54 engages the center of this diaphragm, and as the valve stem is elevated it elevates the valve unit comprising the valve members 19$^a$ and 19$^b$, the connecting stem 63 and the guides 64, opening the valve member 19$^a$ and closing the valve member 19$^b$ against the lower seat 73 in the valve body.

The main pilot valve assembly 18 which controls the entire brine and rinse period is also provided with an upper valve member 18$^a$ and a lower valve member 18$^b$ connected by a connecting stem 63 and each valve member connected to a polygonal valve stem guide 64, all constructed and operating in the same manner as in the brine refill pilot valve assembly 19. Similar reference characters have been applied to other like parts, the only difference being that in the valve assembly 19 a solid valve cap or plug 67 is provided against which one end of the expansion spring 66 seats and is adjusted, while in the valve assembly 18 the adjustable valve cap or plug 74 is provided with a central port 75 receiving one end of a conduit 76 open to line pressure, with the spring 66 actuating the connected valve members 18$^a$ and 18$^b$ in a downward direction in which the upper valve member 18$^a$ seats against a valve seat 57$^a$ in the valve body 65$^a$. When the valve assembly 18 is elevated by upward pressure on its valve stem 54$^a$, the upper valve member 18$^a$ is opened to allow line pressure to communicate with a connecting conduit 82, and the lower valve member 18$^b$ seats against the lower seat 73$^a$ and seals off passage thereat to the central port 68$^a$ and to the drain line 79.

The valve body 65 of the valve assembly 19 is provided with a port intermediate its seats and valve members 19$^a$ and 19$^b$ connected with a brine refill line 77 and ports connected by conduits 78 and 79 with similarly arranged ports in the valve body 65$^a$ of the valve assembly 18, respectively. The latter valve body is also provided with a port intermediate its seats for the valve members 18$^a$ and 18$^b$ connected to the top or dome 81 of the main control valve 13 by a connecting conduit 82.

As shown in FIG. 6, the time control mechanism 17 is provided with notched latches 83 and 83$^a$ each pivotally mounted on a pin 84 and 84$^a$ and each notch adapted to be in or out of engagement with a downturned end 85 of a toggle 52 or 52$^a$, depending on the position of the frequency control assembly 86 and its fingers 103, 107, 108 and 109 (FIGS. 2, 3 and 11 to 15, inclusive). This over-riding frequency control assembly shown in detail in FIGS. 11 to 15, inclusive, operates to lock out the pilot valve action and place the regeneration frequency at the easy command of the customer. It comprises a shaft 88, push buttons 89, 91, 92 and 93, each in the form of a segment attached to the outer end of a pin 97, 94, 95 and 96, respectively, with each pin being of different length and adapted to be depressed or retracted by manipulating its push button.

The controls shown are based on a customer selection of a regeneration cycle twice a day (button 89), once a day (button 91), every other day (button 92) or every fourth day (button 93), although the regeneration cycle or frequency of regeneration can be varied therefrom in the assembly of the control. The recited and selected rate of rotation of the shaft 31 and the cams 32, 33, 34 and 37 is every twelve hours which is found to be the most frequent period of regeneration.

Figure 4:
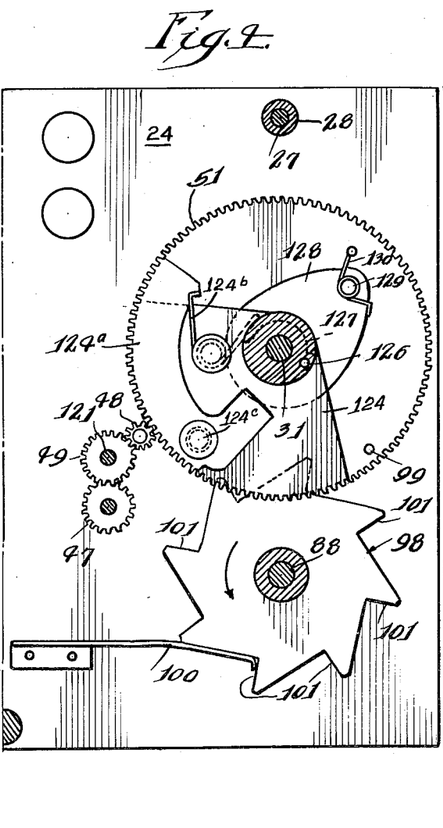
FIG. 4 is a view in vertical cross section taken substantially in a plane represented by the line 4—4 of FIG. 3 and viewed in the direction of the arrows.
Figure 11:
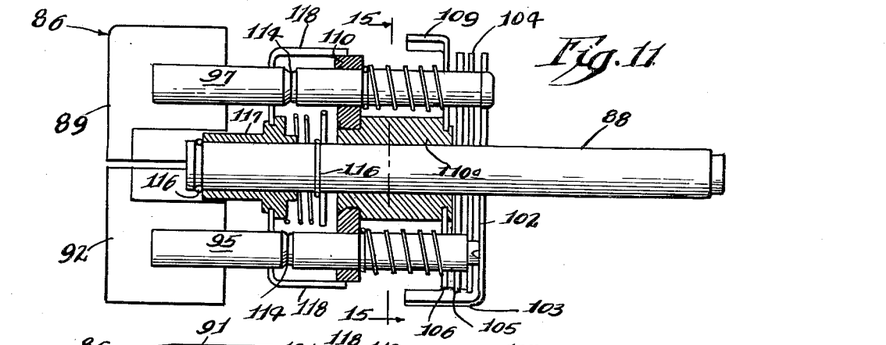
FIG. 11 is a view part in side elevation and part in longitudinal cross section through the regeneration frequency control mechanism shown in side elevation in FIG. 3, the view being taken on approximately the line 11—11 of FIG. 2 and viewed in the direction of the arrows.
Figures 12, 13, 14, 15:
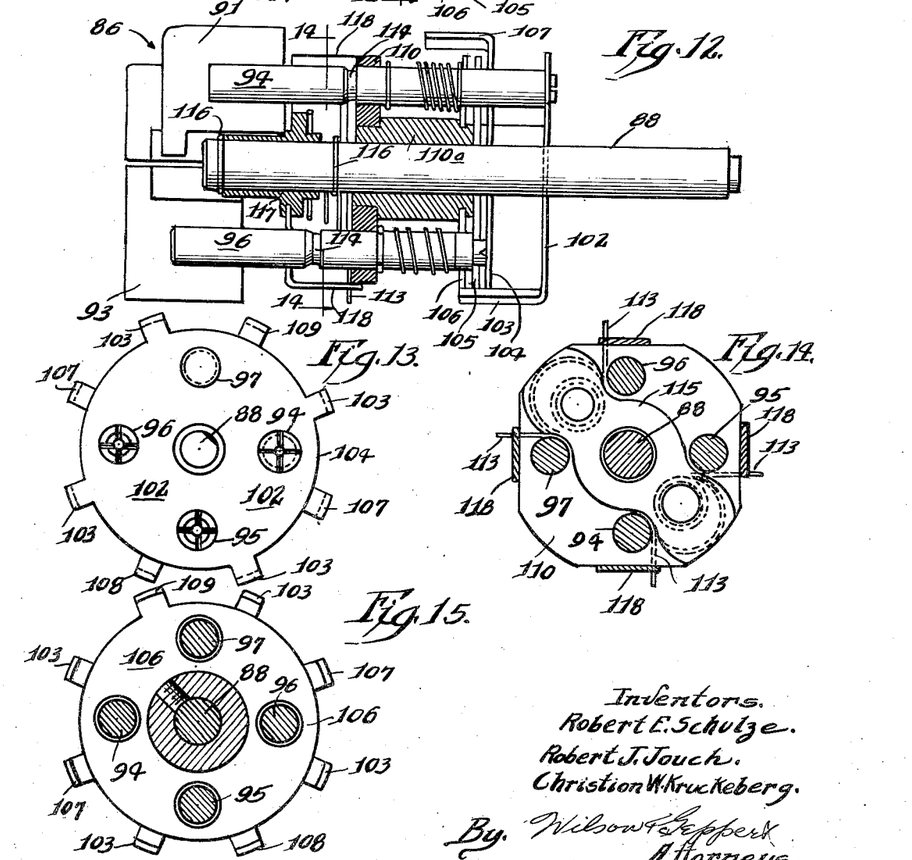
FIG. 12 is a view part in side elevation and part in vertical cross section, taken on approximately the line 12—12 of FIG. 2 and viewed in the direction of the arrows, the button for "one per day" regeneration having been depressed.
FIG. 13 is a view in rear elevation of the frequency control mechanism of FIGS. 11 and 12.
FIG. 14 is a view in vertical cross section taken on substantially the line 14—14 of FIG. 12 and viewed in the direction of the arrows.
FIG. 15 is a view in vertical cross section taken on substantially the line 15—15 of FIG. 11 and viewed in the direction of the arrows.
Figure 18:
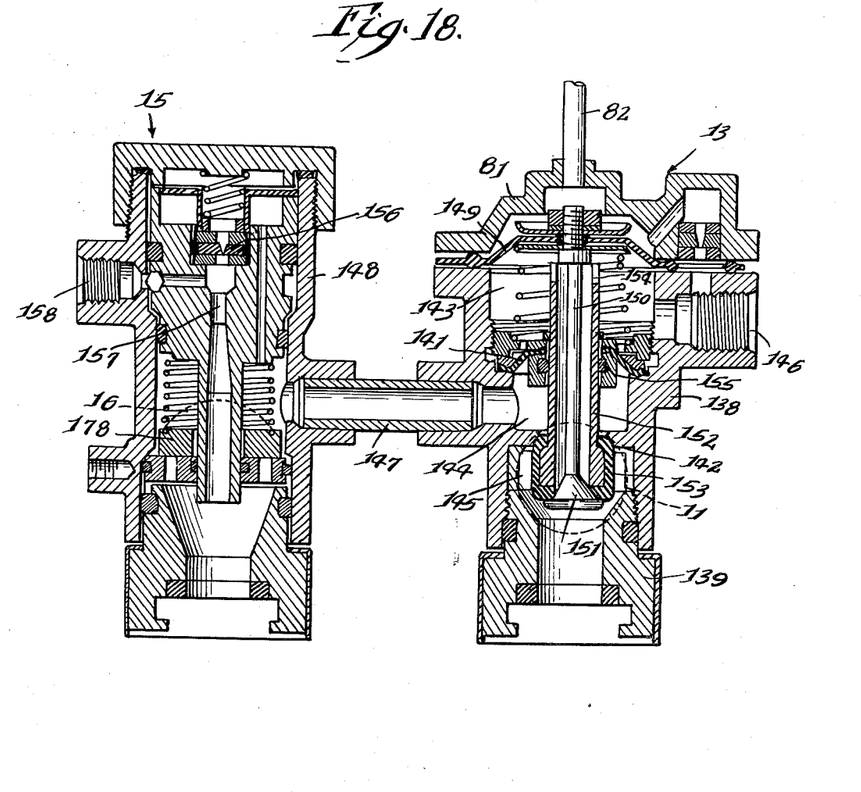
FIG. 18 is a detailed cross-sectional view of the main control valve and eductor assembly which is mounted on the water conditioning tank.
Figure 19:
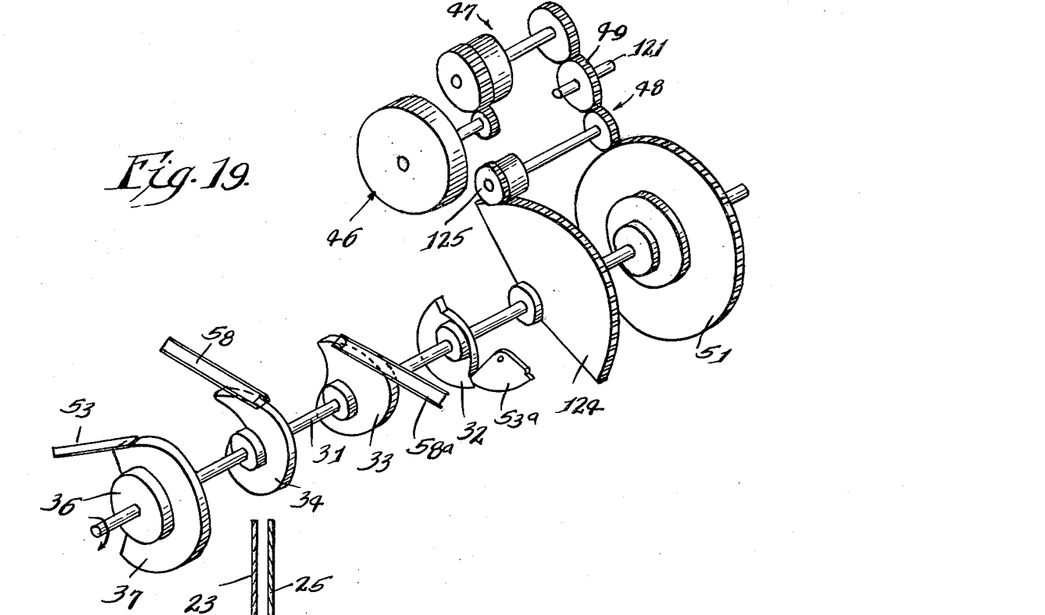
FIG. 19 is an exploded isometric view of the main cam shaft of the control unit and shows the operative relationship of the control cams positioned on the shaft as well as the gear and clutch train connecting the shaft to the timer motor.

The frequency control assembly 86 and a star wheel 98 (FIG. 4) are attached to the shaft 88 and caused to make one complete revolution in four days as a pin 99 on the large gear 51 engages one lobe 101 on the star wheel 98 to move the latter one-eighth of a turn each twelve hour period. A leaf spring 100 limits rotation of the star wheel in one direction. Mounted upon the reduced rear end of the pin 94 is a movable plate 102 having four equally spaced and inturned fingers 103, and adjacent the plate 102 are two additional movable plates 104 and 105 and a stationary plate 106. The plate 104 is mounted on the reduced end of the pin 95 and provided with two inwardly projecting fingers 107, the plate 105 is mounted on the reduced end of the pin 96 and provided with one inwardly projecting finger 108 and the stationary plate 106 is provided with one finger 109. The pins 94, 95, 96 and 97 are slidably mounted in a transverse plate 110 mounted upon a sleeve 110a keyed to the shaft 88 (FIGS. 11 and 12).

Figures 20, 21:
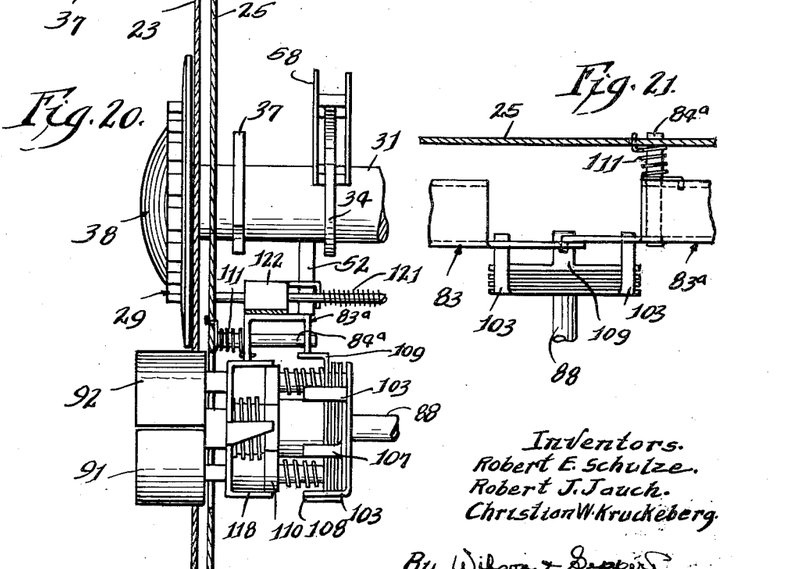
FIG. 20 is a cross-sectional view taken on the line 20—20 of FIG. 6 and looking in the direction of the arrows.
FIG. 21 is a fragmentary top view of the toggle mechanism showing the cooperation between the frequency control and the toggle with only the operative portion of the frequency control being shown.

As each increment of revolution (every twelve hours) of the star wheel and shaft 88 is made, a different finger 103, 107, 108 or 109 is placed in the up position. Those fingers attached to the movable plates 102, 104 and 105 are free to move with their movable plates axially of the shaft 88 when their pins 94, 95 and 96 are moved by their respective control buttons 91, 92 and 93. If the finger 103, 107, 108 or 109 is in its normal forward position (see FIG. 11), the finger will engage and move upwardly the inner ends of the latches 83 and 83a as that finger reaches the up position of the frequency control. Lifting the inner ends of latches 83 and 83a will lower the outer ends of the latches through the pins 84 and 84a, thus lowering the notches 112 so they do not engage the depending ends 85 of the toggles 52 and 52a. However, if the fingers 103, 107 or 108 along with its associated plate 102, 104 or 105, respectively, is moved to a retracted position (see plate 102 and finger 103 in FIG. 12), when that finger is in the up position, it will not engage the inner ends of latches 83 and 83a, in which event a coil spring 111 (FIGS. 20 and 21) urges the inner ends of the latches 83 and 83a downward so that the notches 112 are lifted into engagement with and prevent outward movement of the depending ends 85 of the toggles 52 and 52a. Since the toggle 52 or 52a and its depending end 85 are a rigid structure, the toggle is prevented from moving from its position shown in FIG. 7 to its position shown in FIG. 8 and thus actuation of valves 18 and 19 is prevented.

As different buttons 89, 91, 92 and 93 are pushed, different arrangements of fingers are established for engagement with the latches 83 and 83a. When the button 92 is pushed, retracting plate 104 and fingers 107, the plate 102 is carried along therewith to the retracted position; likewise, when the button 93 is pushed retracting plate 105 and its finger 109, both of the plates 102 and 104 are also carried along leaving only stationary plate 106 and its finger 109 in the normal forward position. The position (FIGS. 3, 11, 12 and 14) of the plates 102, 104, 105 and 106 and their fingers 103, 107, 108 and 109 are secured by two detent springs 113 which drop into grooves 114 on the pins 94, 95, 96 and 97. These detent springs 113 (FIG. 14) carried by a spring retainer 115 held in operative position on the shaft 88 by a snap ring 116, are arranged for release when any button 89, 91, 92 or 93 is pushed to cancel the previously established frequency.

This is accomplished as the selected button engages a spring-biased cam holder 117 held in operative position on the shaft 88 by a snap ring 116, the cam holder carrying the wedge-shaped cams 118 which, when caused to move or slide on the shaft 88 and the cams on the periphery of the plate 110, release the detent springs 113.

A time set knob 119 (FIGS. 1 and 2) is adapted to be depressed to engage the gear train 49 and gear 51 and turned by the customer to rotate its stem 121. This time set knob is depressed whenever it is desired to synchronize the control with the time of day, and when depressed a spring 120 (FIG. 6) drops into a groove on the stem 121. For example, if the time is set for 2 o'clock and regeneration is to be effected twice each day, regeneration will commence at 2 a.m. and 2 p.m. This is accomplished by pushing inwardly on the time set knob 119 to engage gear train 49 and gear 51 of the time gear assembly and gear 51 may be rotated (FIG. 4), as desired. When the knob 119 is depressed, its stem 121 also engages and moves a bowed latch 122 (FIG. 6) which is notched at its ends 123 so that the notches lock the depending ends 85 of the toggles 52 and 52a and the pivot valves 18 and 19 to prevent their actuation as the time is being set. This prevents actuation of the regeneration cycle as the customer sets and passes the desired time period.

When the toggles 52 and 52a are free to actuate the valves 18 and 19, a regeneration will occur during each revolution of the shaft 31. If an extra regeneration is desired, the hour dial 29 must be rotated to bring cams 32, 33, 34 and 37 into position for a regeneration cycle. To prevent any damage to the clock motor, the gear 51 floats on the shaft 31 and turns the shaft through a clutch to be explained later. A segment gear 124 (FIG. 4) is secured to the shaft 31 with its lead teeth 124a being urged radially outwardly by the spring 124b. The lead teeth are pivoted on the segment gear 124 at the pivot 124c. The segment gear 124 is arranged on the shaft 31 so that the lead teeth 124a initially engage the gear 125 and are driven by the clock motor through the pinion gear and clutch train 47, 48, 49 and 125 during the regeneration cycle so as to rotate the shaft 31 and the cams 32, 33, 34 and 37 independently of gear 51.

To the hub of the segment gear 124 is mounted a clutch pin 126 projecting into a cam-shaped hole 127 (shown in dotted outline in FIG. 4) in a dog 128 encompassing the shaft 31. The end of this dog is secured to the time gear 51 by an anchor pin 129 and the dog is spring-loaded down by a spring 130, but is free to move up and down as the clutch pin 126 rides within the cam-shaped hole 127. The pin 126 being affixed to the hub of the segment gear 124, rotates clockwise with the rotation of the hour dial 29 for extra regeneration. At the end of the extra regeneration period, the segment gear 124 is disengaged from gear 125 and the shaft 31 remains stationary while the floating time gear 51 being continuously driven by the clock motor through clutches 47 and 48 and gear 49 advances the dog 128 to pick up the clutch pin 126 and drive the segment gear 124 and the shaft 31. Thus the pin 126 which is mounted on the segment gear 124 may be rotated through any number of revolutions without interfering with the time gear 51 as the driving dog 128 is free to move out of the way. It will thus be seen that whenever an extra regeneration is called for, the clutch pin 126 on the segment gear is advanced, and at the end of the extra regeneration the time gear 51 advances its dog 128 until it catches up with the clutch pin 126 on the segment gear 124 whereupon the unit is again synchronized with time.

By dividing the shaft 31 so that the cams 32, 33, 34 and 37 are secured to the forward portion of the shaft along with the segment gear 124 and its clutch pin 126, the segment gear 124 may be advanced to engage pinion 125 without disturbing the main gear 51 which is properly synchronized to the time of day, the main gear 51 and its dog 128 being secured to the second or rear portion of the shaft 31. Thus the main gear 51 and its dog 128 are only connected to the forward portion of the shaft 31 through the segment gear 124 and its clutch pin 126.

In order to provide for an extra regeneration, when desired, regardless of the position of the regeneration frequency control assembly 86, there is provided a knob 131 connected to a stem 132 containing a cam segment 133, so constructed and arranged as to move the latches 83 and 83a from locking position with the projecting ends of the toggles 52 and 52a when the knob 131 is depressed. This knob remains depressed by means of a spring 134 engaging a detent 135 in the stem 132. A projection 136 on the rear of the hour dial 29 (FIG. 10) engages the spring 134 as the dial rotates to the termination of the regeneration cycle, with such engagement depressing the spring 134 to release it from the detent 135 and permit the stem 132 to return to the out or inoperative position by means of a coil spring 137.

It should be noted that the regeneration cycle on the disclosed embodiment of the control mechanism (FIG. 2) is set to commence at 2 a.m. or 2 p.m., depending upon the initial synchronization of the regeneration frequency control. In order to switch from a.m. to p.m., it is only necessary to rotate the hour dial 29 twelve hours or one complete revolution, thus moving the frequency control one notch.

The main control valve assembly 13 (FIG. 1) comprises a valve body 138 having a dome or top 81 connected to the conduit 82, a base 139 connected to the inlet manifold 12 of the tank 10, a flexible diaphragm 141 and a spaced annular partition 142 provided with a central opening therethrough. This diaphragm and the partition divide the body into an upper chamber 143, an intermediate chamber 144 and a lower chamber 145, the upper opening into drain port or connector 146, and the lower connected to the inlet for the entering untreated water, to the inlet manifold 12 of the tank 10 and to the conduit 76 supplying line pressure to the valve assembly 18. The intermediate chamber 144 is connected by a by-pass conduit 147 to an eductor housing 148 of the eductor assembly 15.

In the dome 81 of the main control valve 13 and bridging the hollow interior of the valve body is provided a resilient or elastic diaphragm 149 and depending from the lower surface of this diaphragm is a valve stem 150 to the lower end of which is affixed a valve member 151. This valve stem is encompassed by a longitudinally movable plunger tube 152 carrying a sealing ring at its lower end providing a valve member 153, and adjacent its upper end provided with outlet ports 154 opening to the drain port 146. The detailed internal construction of this main valve 13 and the eductor assembly 15 are preferably substantially as shown in our copending application Serial No. 731,359, filed April 28, 1958.

The inner circumference of the lower annular partition 142 is spaced from the encompassed plunger tube 152 and provides a valve seat against which the valve member 153 on the plunger tube is adapted to seat when this tube is in elevated position and the main control valve is in position for normal service operation. The upper end of this plunger tube 152 is disposed below and adapted to be contacted by the diaphragm 149 in the manner shown in our above copending application Serial No. 731,359 and, although passing through the diaphragm 141, the latter carries a sealing means such as an O-ring 155 to seal against leakage between the upper chamber 143 and the intermediate chamber 144, the latter being open to the conduit 147 connected to the eductor 15 and the former to the discharge or drain port 146. The lower chamber 145 below the annular partition 142 and a reduction in the valve body 138 is open to the inlet 12 and connected to a supply of fresh but untreated water.

The eductor housing 148 is connected to the body 138 of the main control valve assembly 13 by the connecting conduit or by-pass 147 opening into an annular space in the eductor housing. The entering fresh but untreated water during normal service operation is prevented from entering the conduit 147 by the elevated and closed valves 151 and 153 of the valve assembly in the main control valve assembly 13, but is directed through the inlet manifold 12 into and through the bed A in the tank 10, the treated water passing upwardly through the outlet manifold 14 into the eductor housing 148 and through the outlet port 16 into the service line for use.

In regeneration, the fresh but untreated water is free to pass through the open valve 153 on the plunger tube 152, then depressed by the line pressure of the entering water passing through the line 76 into the pilot valve 18, past the upper open valve 18a and into the line 82 to above the diaphragm 149. The untreated water entering through the open valve 153 passes through the conduit 147 into the eductor housing 148, from where it may pass downwardly through a constricted orifice in a flow regulator or nozzle 156 and throat 157 of the eductor 15, creating a vacuum in a brine conduit 158 connected to the brine control valve 21. Brine enters the eductor housing through the conduit 158, mixes with the entering untreated water in the throat 157 of the eductor and is directed downward as diluted brine into the tank 10 through the normal outlet manifold 14 and through the bed of minerals A in a direction reverse to that during service operation.

The untreated water entering the eductor housing 148 may be withdrawn during regeneration through the outlet port 16 into the supply system of the home to satisfy any demand for fresh water during the regeneration cycle in which a controlled quantity of brine from the brine tank 22 is withdrawn through a conduit 159 into and through the brine control valve 21.

This brine control valve 21 (FIG. 17) comprises a valve body 160 having an upper inlet port for the brine from the conduit 159, an upper chamber 161, an intermediate constricted chamber 162 and a further constriction 163 providing a longitudinal passage opening into the conduit 158. The upper chamber 161 closed by a concaved cap 164 receiving an end of the conduit 159 is provided with a buoyant or float ball valve member 165 preferably formed of a plastic composition capable of withstanding the corrosion effect of the brine. This ball is provided with a stem or tail 166 depending into the intermediate constricted chamber 162 for maintaining the ball in its vertical position and limiting its rotation about a substantially horizontal axis.

The underside of the cap 164 is contoured to conformably receive the buoyant or float ball valve member 165 when elevated by the water entering during refill. To permit flow of refill water through the port 167 in the cap 164 with the ball elevated, one or more radial slots 168 are provided in the underside of the cap each forming a by-pass for the entering water.

Upon a shoulder 169 formed by the constriction between the upper and intermediate chambers 161 and 162 is provided a ported gasket 170 against which the ball valve 165 seats when in lowered position; i.e. when the brine has been exhausted and air tends to follow the brine at which time the ball valve 165 seats and closes off passage through the port of the gasket 170.

Connected to the intermediate chamber and below the ball valve 165 is a port connected to the brine refill line 77 through a flow control or constriction 171. In the longitudinal passage in the further constriction 163 is mounted a valve unit comprising a valve stem 172 carrying a sealing gasket or ring 173 at its upper end and with its lower end affixed to the center of a resilient or flexible diaphragm 174 having its periphery anchored in the base 175 of the valve body 160 by a diaphragm cover 176. The central portion of this diaphragm 174 being free, it is adapted to flex and move the valve stem 172 to open and close the sealing ring 173 from its valve seat formed by the constriction or shoulder 177. With vacuum on the inside of the diaphragm 174 and atmospheric pressure on the outside, the brine valve connected to this diaphragm is opened and suction causes the brine to flow through the conduit 158 into the eductor housing 148 during regeneration.

During service operation untreated water flows through the supply inlet and the inlet manifold 12 of the tank 10 of the water conditioning unit, down through the ion exchange or filter bed A and the treated water flows up through the outlet manifold 14, lifts and opens the check valve 178 encompassing the eductor 157 and flows into the eductor housing 148 and from there into the service line 16.

At a predetermined time, the time control mechanism 17 causes the pilot valve 18ª of the pilot valve assembly 18 to open, thereby pressurizing the chamber above the diaphragm 149 in the main control valve 13. Water is then directed through the by-pass conduit 147 to the eductor housing 148 and the port to the house service lines 16. As water flows through the eductor housing 148 a vacuum is created in the brine conduit 158 connected to the brine control valve 21. With vacuum on the inside of the flexible diaphragm 174 and atmospheric pressure on the outside, the brine valve is elevated to open position, whereupon suction causes brine to flow into the eductor housing 148.

Brine diluted with the water entering the eductor nozzle 156 flows downwardly through the usual outlet manifold 14 and upwardly through the bed of ion exchange and/or filter material A and out through the drain port 146 of the main control valve 13, it being understood that the valve member 153 on the plunger tube 152 is lowered into seating engagement with its valve seat 154 and the valve member 151 on the valve stem 150 is open to permit the effluent to pass upwardly through the plunger tube 152 to the drain port 146.

Brine continues to flow until the float ball 165 seats and thereafter rinse water flows through the eductor nozzle 156 following the path of the brine to thereby rinse the brine from the softener. At the end of the predetermined period, the time control mechanism 17 causes the pilot valve member 18ª to close and the valve member 18ᵇ to open, thereby venting the top chamber of the main control valve 13 to the brine tank 22 through the connecting line or conduit 79, pilot valve member 19ᵇ, line 77 connected to the brine valve 21 and brine line 159.

When the main control valve 13 returns to service, line pressure is established in the eductor 15 and brine conduit 158 is connected with the brine valve assembly 21. Line pressure in the brine valve assembly 21 causes its diaphragm 174 to be depressed and close the brine valve 172.

After a short interval of time, the cams in the control mechanism 17 open the pilot refill valve member 19ª and close the valve member 19ᵇ, causing water from the line 76 to flow into the upper portion of the pilot valve 18, through the connecting line 78, open valve member 19ª, line 77, through the brine valve 21, line 159, and into the brine tank 22. The flow control 171 for the water entering the brine valve 21 through the line 77 limits the brine refill rate. After a predetermined period the adjustable cams in the control mechanism 17 positively close the pilot valve member 19ª and stop the brine refill period with extreme accuracy.

From the above description and the disclosure in the drawings, it will be appreciated that the present time control and metering system has many novel inherent features and advantages, among which are the following:

(1) All controls are provided in one location which greatly facilitates their operation.

(2) The refill water is accurately metered and based on time at a predetermined flow rate, with the flow being stable at pressures varying between 15 and 125 p.s.i.

(3) The main brine valve which is vacuum operated and requires no pilot valve provides for a positive shut-off.

(4) The double cam arrangement for actuating the pilot valve controlling the brine and rinse period and for actuating the pilot refill valve, operate on and off by a snap action which assures optimum accuracy and requires but a minimum of power for their operation. Furthermore, this provides for a most sensitive control.

(5) But a single timer motor is required for controlling all operations, and may be operated either from the usual power source or from a battery as but little power is required.

(6) The double-acting pilot valves are preferably of plastic composition as there is no waste to drain.

(7) Provides for calendar sequencing.

(8) Provides for a push button frequency control with a self-cancelling feature.

(9) The timed extra regeneration does not upset normal or previously determined settings.

(10) Provides for variation in the total time of regeneration.

(11) The desired time setting may be effected without initiating regeneration.

(12) As there is no pressure on the brine tube, the wall of the tube may be substantially thinner than in prior systems and there is less pressure (suction) loss.

(13) The brine tank is devoid of any valve parts and the valve being located at the exterior of the tank is not subject to the objections incident to its placement within the tank.

(14) By providing a fixed refill volume, various types of salt may be employed in the brine tank to form the brine solution.

(15) By providing a variable cam arrangement for controlling salt dosage, the controls operate with greater ease and efficiency.

(16) Permits the use of packless pilot valves in the system.

Having thus disclosed the invention, we claim:

1. A diaphragm-actuated valve assembly, comprising a valve housing having an upper chamber, an intermediate chamber and a lower chamber, a valve seat between the upper and intermediate chambers, a buoyant ball valve in said upper chamber, a closure forming the end wall of the upper chamber and provided with a port into said upper chamber, a valve seat in the closure adapted to accommodate said ball valve in elevated position and slots in said valve seat to allow passage of liquid around the ball valve, an inlet port communicating with said intermediate chamber, a flow restrictor in said inlet port, a flexible diaphragm providing an end wall of the lower chamber and subjected to atmospheric pressure, a reciprocable valve in said lower chamber and having one end secured to and actuated by said diaphragm, the other end of said reciprocable valve having a head provided with sealing means to shut off communication between the intermediate and lower chambers, and a port communicating with the lower chamber such that vacuum in the lower chamber from the communicating port will cause the reciprocable valve to open and liquid pressure in the lower chamber will cause said valve to close.

2. A diaphragm-actuated valve assembly which is positively closed by liquid pressure and opened by vacuum, comprising a valve body having a central chamber extending therethrough, plural ports communicating with said central chamber, a diaphragm extending across an open end of said chamber and having its periphery secured to the valve body, whereby one side of said diaphragm is exposed to atmospheric pressure, a valve member secured at one end of said diaphragm and reciprocable in said chamber, an enlarged free end on said valve member, a valve seat intermediate the ends of said chamber and cooperating with said enlarged free end of the valve member, one of said plural ports connected to said central chamber between said valve seat and said diaphragm, a second of said plural ports communicating with said central chamber at the open end thereof opposite said diaphragm, a third port communicating with said central chamber between said second port and said valve seat and with a source of liquid pressure, and means connecting said first mentioned port with a vacuum source whereby said valve member is actuated to open position by said diaphragm when said vacuum source communicates with said chamber to draw liquid through said chamber from said second port and to closed position by liquid pressure from said third port acting on the surface of said diaphragm opposite to that exposed to atmospheric pressure.

3. A diaphragm-actuated valve assembly as set forth in claim 2, in which a second valve seat is located between said second and third ports, and a ball valve is positioned in said central chamber between the second valve seat and the second port.

References Cited in the file of this patent
UNITED STATES PATENTS

| | | |
|---|---|---|
| 900,053 | Bauer | Sept. 29, 1908 |
| 2,596,330 | Everard | May 13, 1952 |
| 2,744,867 | Webb | May 8, 1956 |
| 2,845,092 | Vomacka | July 29, 1958 |
| 2,863,559 | Schulze | Dec. 9, 1958 |
| 2,881,803 | Koob | Apr. 14, 1959 |
| 2,906,332 | Rosten et al. | Sept. 29, 1959 |